United States Patent [19]

Conrader

[11] 4,034,457

[45] July 12, 1977

[54] VALVE POSITIONING TOOL

[76] Inventor: Charles E. Conrader, 1619 S. Norman Drive, Melbourne, Fla. 32901

[21] Appl. No.: 590,422

[22] Filed: June 26, 1975

[51] Int. Cl.[2] .......... B23P 19/04

[52] U.S. Cl. .......... 29/213 R; 29/252

[58] Field of Search .......... 29/213–220, 29/252

[56] References Cited

U.S. PATENT DOCUMENTS

| | | | |
|---|---|---|---|
| 2,003,756 | 6/1935 | Nagel | 29/252 |
| 2,490,284 | 12/1949 | Simart | 29/252 |
| 3,069,761 | 12/1962 | Sommer | 29/252 |
| 3,337,943 | 8/1967 | Powell | 29/252 |

*Primary Examiner*—James L. Jones, Jr.

*Attorney, Agent, or Firm*—Duckworth, Hobby, Orman, Allen & Pettis

[57] ABSTRACT

A valve positioning tool for supporting valves in proximity to valve seats within a cylinder head and piston sleeve assembly for an overhead valve, internal combustion engine. The valve positioning tool has a frame with pivotally attached, biased clamping devices for engaging the flange of the cylinder assembly, to restrain the movement thereof. The valve positioning tool also includes a positioning device for communicating with and locating the valves within the cylinder assembly. An extending device is attached to the frame and to the positioning device for axially extending the positioning device within the cylinder assembly. The detachable surfaces of the positioning device are adapted to deform when in contact with the valves and the internal surfaces of the cylinder assembly.

14 Claims, 2 Drawing Figures

VALVE POSITIONING TOOL

BACKGROUND OF THE INVENTION

1. Field of the Invention

This invention relates to tools for servicing internal combustion engines and more particularly, to a valve positioning device for supporting valves in communication with valve seats within a cylinder head and piston sleeve assembly of the type having a flanged base.

2. Description of the Prior Art

The owners of aircraft of the type having overhead valve, internal combustion engines are required by FAA safety regulations to make considerable monetary investments in periodically having these engines dismantled, inspected and rebuilt. The charges for rebuilding such an engine are highly labor intensive because a highly skilled, certified A & E (aircraft and engine) mechanic must perform, or at least supervise, all of this work. Therefore, the introduction of a labor saving device to be used in this process should result in a considerable savings to any A & E mechanic who specializes in rebuilding these engines.

One particularly time-consuming task in the complex process of rebuilding an aircraft engine involves the removal and reinsertion of valve springs within the cylinder head assembly, which is required to provide access for grinding the valves and the valve seats. in U.S. Pat. No. 3,742,579 Oftedahl describes an elaborate apparatus for supporting the six cylinders of an aircraft internal combustion engine, rotating these cylinders to facilitate the grinding of valves and valve seats, and a valve restraining device for use in installing the valve spring. The Oftedahl devices uses two opposing plates which simultaneously engage the flanged base sections of all six cylinder assemblies. These plates are secured to the frame section by multiple studs and wingnuts. The Oftedahl device is unnecessarily complicated and expensive because it is designed to simultaneously hold all six cylinder assemblies, whereas the mechanic can work only on one cylinder assembly at a time. Also, the Oftedahl device discloses no method for preventing the marring or scratching of the valves, the cylinder head or the cylinder sleeve assembly.

In a related device, Krogman, in U.S. Pat. No. 1,697,921, discloses a repair stand having a valve supporting bar which extends longitudinally beneath the center portion of the cylinder head and thereby prevents the valves from decoupling from the head when the valve springs are removed.

SUMMARY OF THE INVENTION

The present invention relates to a valve positioning tool for supporting the valves of an overhead valve, internal combustion engine within the cylinder head and piston sleeve assembly. The valve positioning tool have a frame with a biased clamping means pivotally attached thereto for engaging an annular flange of the cylinder assembly to restrain the movement thereof. The valve positioning tool also includes a positioning means for communicating with and locating the valves within the cylinder assembly, with the positioning means having multiple deformable communicating surfaces adapted to conform to the internal surfaces of the cylinder assembly and the valves. An extending means is attached between the frame and the positioning means for axially extending the positioning means within the cylinder assembly. The valve positioning tool further includes a restraining means connected between the frame and the clamping means for biasing the clamping means either in the open or engaged position.

BRIEF DESCRIPTION OF THE DRAWINGS

Other objects, features and advantages of this invention will be apparent from a study of the written description and the drawings in which.

DESCRIPTION OF THE PREFERRED EMBODIMENT

Figure 1:
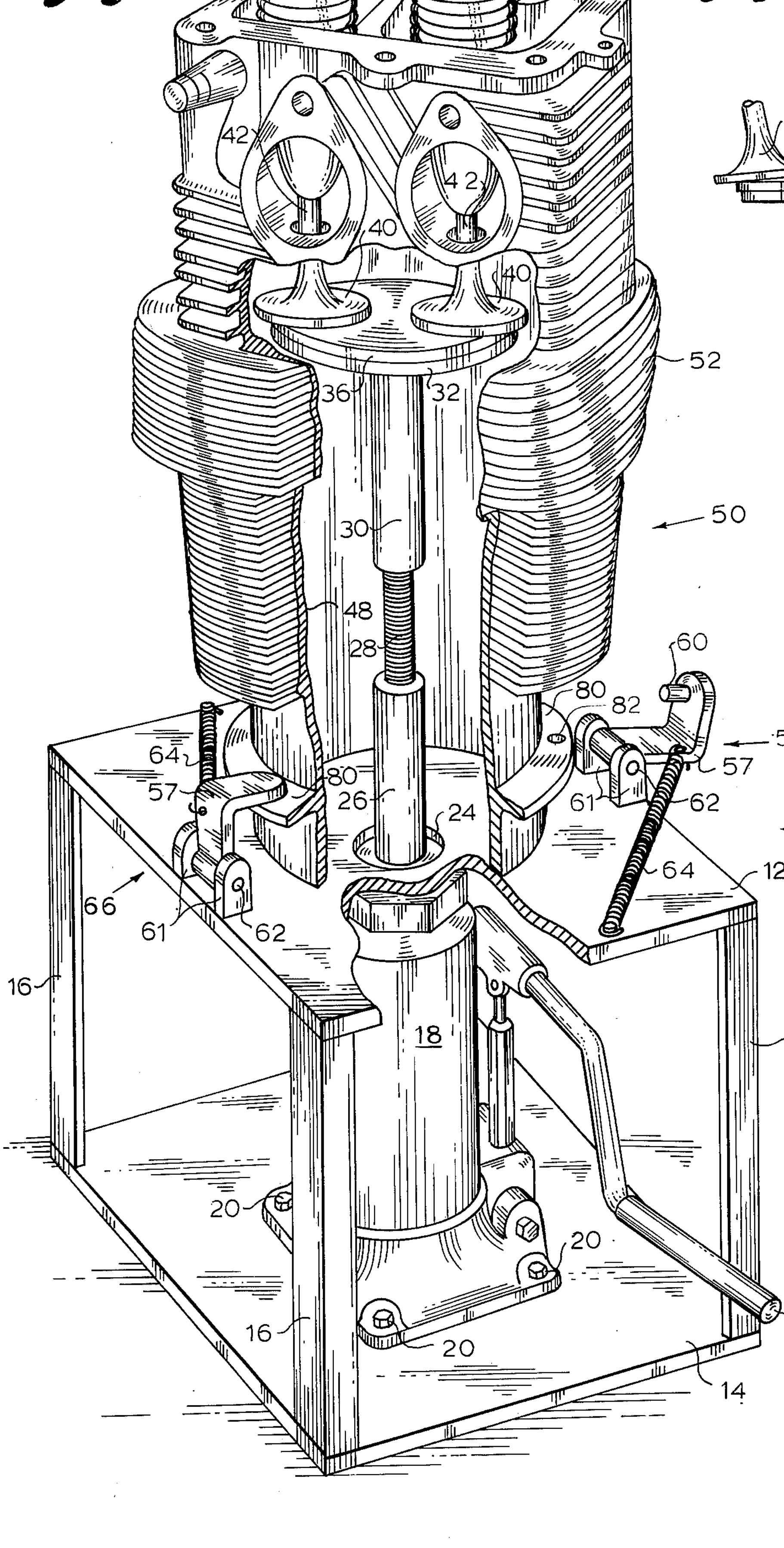
FIG. 1 shows a perspective view of a valve positioning tool in accordance with one embodiment of the present invention. The front portions of the cylinder assembly and the frame of the valve positioning tool are sectioned to reveal more clearly the salient hidden features.

A valve positioning tool 10 is illustrated by FIG. 1 as having a metal frame composed of a lower rectangular base plate 14 connected to a generally parallel, congruent rectangular upper base plate 12 by four corner-located L-shaped support elements 16. A hydraulic or pneumatic extending device 18, similar to that used for automotive jacks, is centrally mounted to the lower base plate 14 by multiple bolts 20. The upper base plate 12 has a centrally located circular aperture 24 adapted to permit a first extending element 26, which is cylindrically shaped and which is coaxially located with respect to extending device 18, to communicate therethrough. The first extending element 26 has an end-located threaded section 28 which engages the threaded cylindrical bore 29 of cylindrical coupling rod 30.

Figure 2:
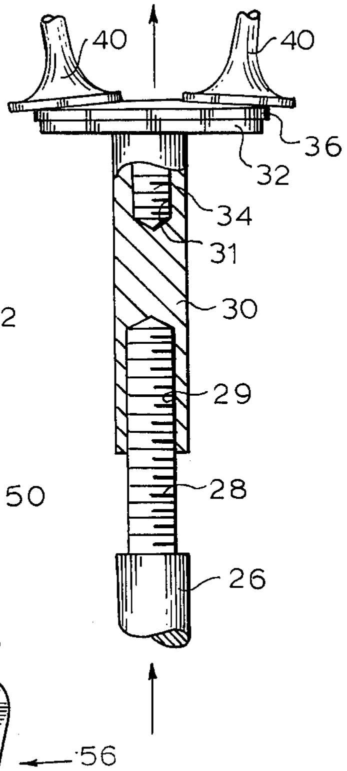
FIG. 2 is a frontal elevation of the positioning means as it communicates with the valve heads.

With reference to FIG. 2, the opposite end of the coupling rod 30 has a threaded, cylindrical bore 31 which couples with a coaxially located threaded stud 34, attached by ordinary means to a positioning device 32. A deformable communicating surface 36 fabricated from a pliable plastic or rubber material is removably attached to the disc-shaped positioning device 32. The diameter of the deformable communicating surface 36 is slightly larger than the diameter of the positioning device 32. The top of deformable communicating surface 36 is shaped to evenly communicate with the external surfaces of valve heads 40. It should be obvious that the circumference of the deformable communicating surface 36 could be fabricated to have a lip which would engage and fully shield the circumference of positioning device 32.

With reference to FIGS. 1 and 2, the diameter of deformable communicating surface 36 is predetermined to provide a clearance fit within cylinder sleeve 48 of a cylinder assembly 50 to prevent the scratching or marring of the internal surfaces thereof. The upper portion of the deformable communicating surface 36 is adapted to deform to the contour of the head section 40 of valve 42 to prevent the scratching or marring thereof.

With reference to FIG. 1, the cylinder assembly 50, composed of the cylinder sleeve 48 and a head section 52 of an internal combustion engine, is fitted to the valve positioning tool 10 by inserting the positioning device 32 and the attached deformable communicating surface 36 into the cylinder sleeve 48, and advancing this communication by axially lowering the cylinder assembly 50 onto the positioning device 32 until the deformable communicating surface 36 communicates with the heads 40 of the valves 42. The quiescent height of the positioning device 32 may be adjusted to provide a clearance between the lower edge of cylinder sleeve 48 and the upper base 12 by rotating the positioning device 32 to vary the length of the threaded coupling between the threaded bore 29 of the coupling rod 30 and the threaded section 28 of the first extending element 26.

The cylinder assembly 50 is retained in this position by the operation of paired clamps 56 and 66. A first clamp 56 is composed of an L-shaped element 57 having at one end of perpendicularly attached cylindrical coupling pin 60, and having at the opposite end thereof a shaft 62 which is rotatably attached to two parallel opposing support members 61, which in turn are attached to the periphery of upper base 12. The coupling pin 60 of the first clamping device 56 is adapted to slidably engage a mounting hole 82 in an annular flange section 80 at the lower end of the cylinder sleeve 48. A second clamp 66, identical to first clamp 56, engages another mounting hole 82 in the annular flange section 80 at the lower end of the cylinder sleeve 48. A deformable coiled spring 64, which is attached to upper base 12 and to the elbow of L-shaped element 57, is adapted to bias the clamping device into one of two stable positions. The first or "open" position, which is illustrated by first clamping device 56 as shown in FIG. 1, has the L-shaped element 57 rotated outwardly about pivot 62, thus allowing cylinder assembly 50 to be lifted axially from positioning device 32. The second quiescent position, or the "engaged" position, is illustrated by the second clamping device 66. In the engaged position coupling pin 60, which is normally attached to L-shaped element 57, will slidingly engage the access hole 82 of the annular flange 80 of the cylinder sleeve 48.

The operation of the valve positioning tool 10 will now be illustrated with reference to FIG. 1. The positioning device 36 is axially inserted within the cylinder sleeve 48, and the cylinder assembly 50 is then axially lowered thereon until the deformable communicating surface 36 abuts the heads 40 of the valves 42. The first coupling device 56 and the second coupling device 66 are then rotated from the open position to the engaged position in which the coupling pin 60 engages the hole 82 in the annular flange section 80 of the cylinder sleeve 48. Next, a pump handle 22 of the extending device 18 is actuated to cause the extension of the positioning device 36. This extension then forces the valves 42 to move to a position in close proximity with their respective valve seats, thus compressing valve springs 46. The operator is then free to following the normal procedures for removing the valve springs and the valves, grinding the valve seats, and then replacing the valves and the valve springs therein. The valve positioning tool is disengaged from the cylinder assembly by following the above-described engagement steps in the reverse order. Following this procedure and using the valve positioning tool, an experienced A & E mechanic can complete a "valve job" on a typical opposed six cylinder aircraft engine in approximately twenty to thirty minutes, whereas up to two hours are normally required if the A & E mechanic uses commonly available tools.

It will be clear at this point that a tool for supporting valves within a cylinder head and piston sleeve assembly for an overhead valve internal combustion engine has been provided which overcomes some of the problems of prior art valve positioning tools. This invention is greatly simplified over the prior art by engaging only the single cylinder assembly on which the operator is working. This simplified design results in a more inexpensive apparatus which has the inherent advantage of being adaptable to cylinder assemblies of different sizes and having different valve configurations. Also, this invention incorporates a positioning device having a special deformable surface for positioning the valves within the valve seats without scratching or marring the internal surfaces of the cylinder apparatus. However, the invention is not to be construed as limited to the particular forms disclosed herein since these are to be regarded as illustrative rather than restrictive.

I claim:

1. A valve support means for positioning valves within an internal combustion engine cylinder head and piston sleeve assembly of the type having a flanged base and overhead valves, comprising in combination:

a frame;

a plurality of L-shaped members, each pivotally attached at one end to said frame and having at the opposite end thereof a pin assembly for engaging a corresponding aperture in said flanged base for restraining the movement thereof;

positioning means for locating said valves within said cylinder assembly, said positioning means including thereon a deformable communicating surface for resiliently communicating with and conforming to said valves of said cylinder assembly; and extending means attached to said frame and said positioning means whereby said positioning means may be axially extended within said cylinder assembly.

2. An apparatus as described in claim 1 wherein said positioning means have removable communicating surfaces for use with different cylinder assemblies and valve configurations.

3. An apparatus as described in claim 2 having means coupled to said positioning means for adjusting the position of said extending means.

4. An apparatus as described in claim 3 having means coupled to said frame for biasing said clamping means in either an open or engaged position.

5. An apparatus as described in claim 4 wherein said removable deformable communicating surfaces of said positioning means include an upper surface which is formed to evenly communicate with said valves within said cylinder assembly.

6. An apparatus as described in claim 5 wherein said means for biasing said clamping means comprises a plurality of deformable springs, each of said springs being attached at one end thereof to said frame and attached at the opposite end thereof to a distended section of said L-shaped clamping members.

7. An apparatus as described in claim 6 wherein said extending means is hydraulically operated.

8. An apparatus as described in claim 7 comprises a hydraulic piston assembly having an attached coaxially extending member and a manual actuator, whereby said actuator uses hydraulic advantage to vertically displace said piston assembly and said coaxially extending member.

9. A valve support means for positioning valves within an overhead valve, internal combustion engine cylinder head and piston sleeve assembly of the type having a flanged base, comprising in combination:

a frame;

a plurality of L-shaped clamps pivotally attached to said frame for engaging said flanged base of said cylinder assembly, with each of said L-shaped clamps having at a distended end thereof a pin for engaging a corresponding aperture in said flanged base for restraining the movement thereof;

means for biasing said clamping means in either an open or engaged position;

positioning means for locating simultaneously all of said valves within said cylinder assembly, said positioning means having deformable communicating surfaces thereon for communicating with and positioning said valves within said cylinder assembly, said deformable communicating surfaces formed from a material having an elastic memory and being relatively deformable with respect to said valves; and extending means attached to said frame and said positioning means whereby said positioning means may be axially extended within said cylinder assembly.

10. A valve support tool for positioning valves within an internal combustion engine cylinder head and piston sleeve assembly of the type having a flanged base and overhead valves, said tool comprising in combination:

a frame;

clamping means movably coupled to said frame for engaging opposing sections of said flanged base of said cylinder assembly for restraining the longitudinal movement thereof, with said clamping means including pin assemblies attached thereto for engaging corresponding apertures within said opposing sections of said flanged base;

a positioning platform having deformable communicating surfaces thereon for communicating with and positioning simultaneously all of said valves within said cylinder assembly, with said deformable communicating surfaces formed from a material having an elastic memory and being relatively deformable with respect to said valves and said positioning platform; and extending means coupled between said frame and said positioning platform for extending said positioning platform between said opposing sections of said flanged base and into communication with said valves, whereby all of said valves may be positioned simultaneously within said cylinder assembly.

11. The valve positioning tool as described in claim 10 further comprising means attached to said frame for biasing said pin assemblies of said clamping means into either an engaging or nonengaging position.

12. The valve positioning tool as described in claim 11 wherein said deformable communicating surface is removably coupled to said positioning platform.

13. The valve positioning tool as described in claim 10 wherein the effective diameters of said positioning platform and said deformable communicating surface are substantially greater than an effective diameter of said extending shaft.

14. The valve positioning tool as described in claim 13 wherein said extending means comprises a manually operated hydraulic pump for axially moving an extending shaft, having said positioning platform coupled at a distended end thereof, into said cylinder assembly.

* * * * *